United States Patent [19]

Carini

[11] 4,031,420
[45] June 21, 1977

[54] FLYWHEEL DRIVE SYSTEM

[76] Inventor: Eugene P. Carini, 800 28th Ave., Vero Beach, Fla. 32960

[22] Filed: Apr. 22, 1976

[21] Appl. No.: 679,193

[52] U.S. Cl. .................................. 310/74; 310/112
[51] Int. Cl.$^2$ ........................................ H02K 7/02
[58] Field of Search ........... 310/24, 112, 114, 126, 310/83

[56] References Cited

UNITED STATES PATENTS

| 2,394,296 | 2/1946 | Farrell | 310/112 |
| 3,022,383 | 2/1962 | Springer | 310/112 X |
| 3,477,536 | 11/1969 | Carini | 310/112 X |
| 3,526,795 | 9/1970 | Pecs | 310/74 |
| 3,562,567 | 2/1971 | Carini | 310/112 X |

Primary Examiner—Donovan F. Duggan

[57] ABSTRACT

A drive system including at least a pair of flywheels which rotate in opposite directions about a common axis. The flywheels are drivingly coupled by means of rollers and a first of the flywheels is driven by an electric motor or motors mounted thereon and adjacent the periphery thereof. A rotatable output shaft is positioned between the counterrotating flywheels and the motion of the flywheels is transmitted to the output shaft by means of a roller which contacts the facing surfaces of the flywheels and is radially movable with respct to the flywheels.

12 Claims, 2 Drawing Figures

FLYWHEEL DRIVE SYSTEM

BACKGROUND OF THE INVENTION:

1. Field of the Invention

The present invention relates to enhancing the efficiency of electric drive systems and particularly to the provision of a direct current powered drive system suited for use in an environment, such as an electrically powered vehicle, where operating power is derived from storage batteries subject to periodic recharge. More specifically, this invention is directed to a flywheel type drive wherein energy for initiating and maintaining the rotation of a flywheel mechanism is furnished by an electric motor or motors. Accordingly, the general objects of the present invention are to provide novel and improved methods and apparatus of such character.

2. Description of the Prior Art

While not limited thereto in it utility, the present invention is particularly well suited for employment in electrically powered vehicles. As petroleum and natural gas reserves dwindle, increasing attention is being directed to electrically powered vehicles. While electrically powered vehicles were at one time widely used, such vehicles drastically declined in popularity when the availability of inexpensive petroluem products became widespread. Despite renewed interest in the electrically powered vehicles in recent years, there has in fact been little progress made in developing a practical "electric". Thus, available electrically powered vehicles, the conventional golf cart type vehicle presently being the most often used variety of such vehicle, are characterized by a number of inherent deficiencies. The single deficiency which constitutes the principal impediment to widespread usage is lack of range. This lack of range results from the rather high power drain imposed on the bank of storage batteries which must presently be utilized as the power source. This power drain, to a large measure, results from the substantial weight of the conventional lead-acid type battery which is employed in the power supply. Thus, a cruising range in excess of 25 miles, with a reasonable margin of reserve, can not presently be achieved in an electrically powered vehicle of accpetable size for everyday use because of the excessive demands imposed on the bank of storage batteries largely as a consequence of the weight of those batteries.

In recent years attempts have been made to improve the cruising range of electrically powered vehicles through use of lightweight materials in the vehicle body and chassis and by resort to aerodynamic styling. These efforst have had some limited success. Attempts to develop power sources which could be used in place of the conventional heavy lead-acid storage battery have to date been totally unsuccessful. As evidenced by the present inventor's U.S. Pat. No. 3,562,567, effort has also been devoted to improving the efficiency of the drive systems which convert the potential energy of the storage batteries to the kinetic energy of the drive shaft. Such efforts to improve drive system efficiency, particularly techniques which have employed flywheel type drives, have been moderately successful. However, since it remains necessary to rely upon heavy storage batteries as the power source, further improvements in drive system efficiency are required.

SUMMARY OF THE INVENTION

The present invention is a novel and improved electric drive system characteristic by enhanced efficiency when compared to the prior art. Thus, in accordance with the present invention, a "pancake" drive including at least a pair of flywheels which rotate about the same axis in opposite directions is provided. In accordance with a preferred embodiment of the invention, one of the counterrotating flywheels is directly driven by one or more electric motors and the motion of this first or drive flywheel is coupled, by means of rollers, to the second or driven flywheel. The coupling of the counterrotating flywheels to one another is accomplished, in the preferred embodiment, without a direct mechanical connection, such as a gear train, and the freely rotatable coupling rollers preferably contact the two flywheels adjacent their peripheries.

Also in accordance with the preferred embodiment of the invention, the electric motor or motors are mounted directly on the drive flywheel, at the periphery thereof, and drivingy engage a ring gear which is coxial with the drive flywheel.

Also in accordance with a preferred embodiment of the invention, the power take off for the drive system is located between the counterrotating flywheels. The power take off mechanism includes power-take-off roller which is radially movable with respect to the axis of rotation of the flywheels, along a rotatable output shaft, in both directions with respect to said axis of rotation. The power-take-off roller is drivingly coupled to the output shaft and will contact both flywheels. Depending upon the position of the roller with respect to the axis of rotation of the flywheels, the output shaft will be driven in the clockwise or counterclockwise direction. The drive system will be in neutral and the output shaft will not rotate when the power-take-off roller is centered on the axis of rotation of the flywheels.

BRIEF DESCRIPTION OF THE DRAWING

The present invention may be better understood and its numerous objects and advantages will become apparent to those skilled in the art by reference to the accompanying drawing wherein like reference numerals refer to like elements in the two figures and in which.

Figure 1:
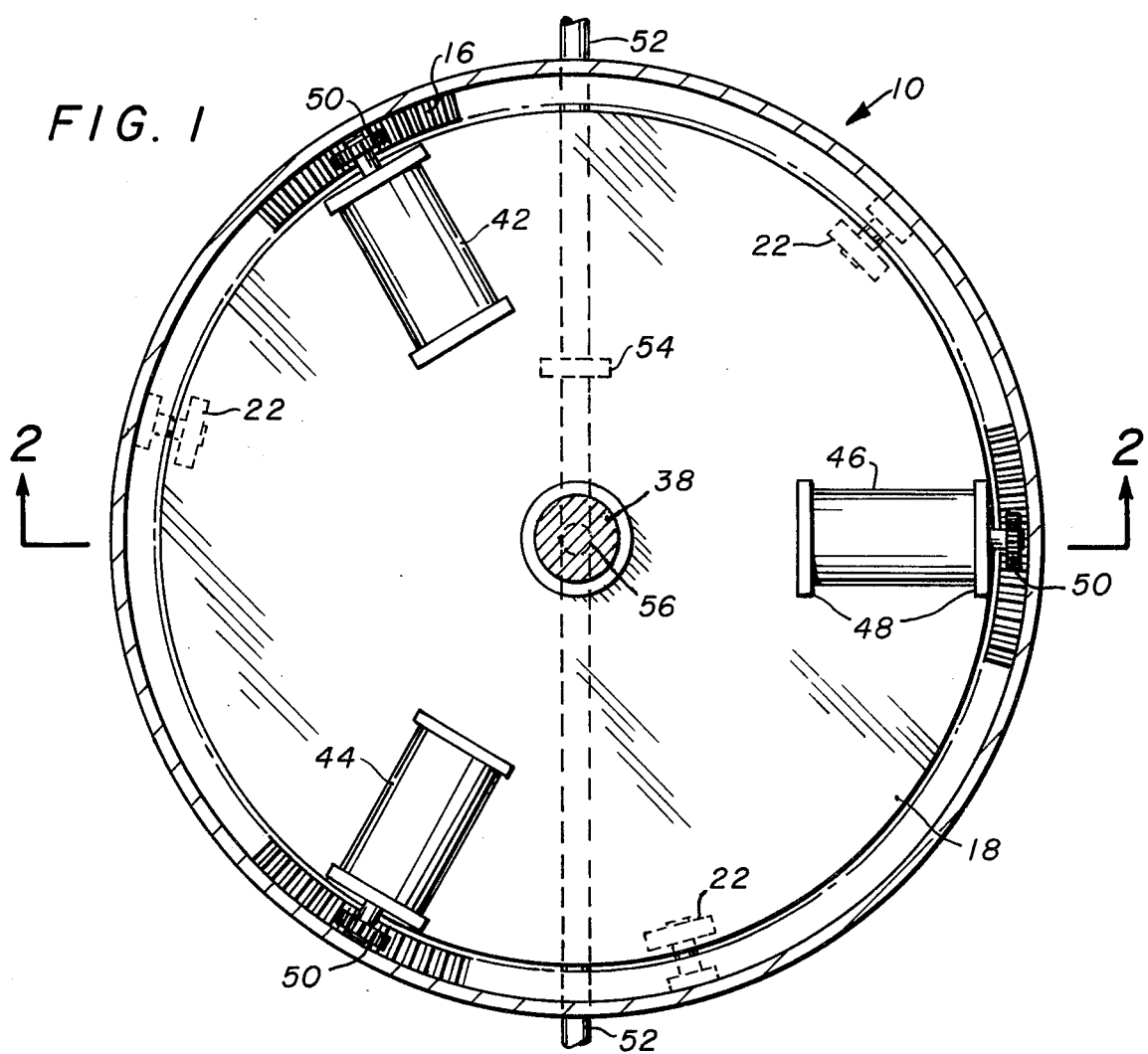
FIG. 1 is a top plan view, with the housing cover removed, of a drive system in accordance with a preferred embodiment of the present invention.
Figure 2:
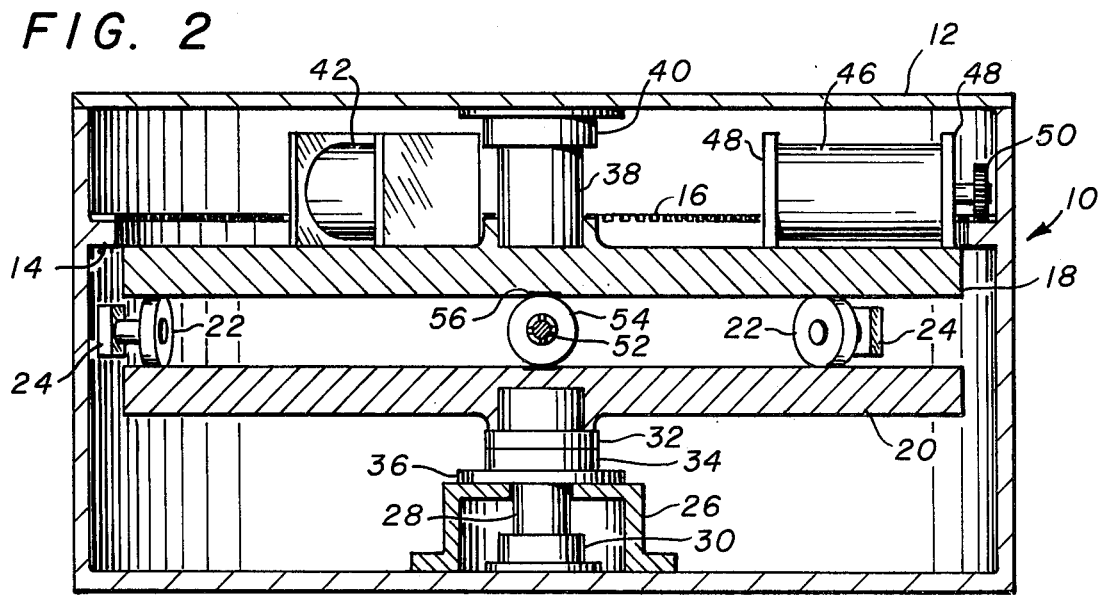
FIG. 2 is a schematic cross-sectional side elevation view, taken along line 2—2 of FIG. 1, of the apparatus of FIG. 1.

DESCRIPTION OF THE PREFERRED EMBODIMENT:

With reference now to the drawing, and considering jointly FIGS. 1 and 2, a drive system in accordance with a preferred embodiment of the present invention includes a housing which has been indicated generally at 10. While housing 10 has been shown as being cylindrical in cross-section, it will be understood that any convenient shape which will accommodate the drive system components to be described below may be utilized. The top cover 12 of housing 10, which may be removable attached to the remainder of the housing by any suitable means to enable servicing, has been removed in FIG. 1 to facilitate understanding of the invention.

Housing 10 is provided, on its interior sidewall, with an inwardly extending flange 14 which defines a circular opening. Flange 14 will typically be integral with housing 10. In the disclosed embodiment a ring gear 16 is provided on the upper surface of flange 14. It will, of course, be understood that ring gear 16 may be integral with flange 14 or a separate element attached to the flange by any suitable means. In the usual case, where flange 14 is integral with the housing, ring gear 16 will be a separate element removably attached to the flange so as to permit replacement of the ring gear in the unlikely event that gear teeth become chipped or broken.

The drive and power conversion system positioned within housing 10 includes a pair of counterrotating flywheels 18 and 20. Flywheels 18 and 20 are supported, in the manner to be described below, so as to rotate about a common axis. In the disclosed embodiment flywheel 18 is the drive flywheel and is caused to rotate, as will become apparent from the following description, by an electric motor or motors. Flywheel 20, the driven flywheel, is coupled to flywheel 18 by a plurality of rollers 22. Rollers 22, which preferably have rubber flywheel contacting portions, are freely rotatable by means of being keyed to short shafts which are mounted in bearing housings, such as housings 24, affixed to the inner sidewall of housing 10. Rollers 22 firmly contact the facing surfaces of flywheels 18 and 20.

Flywheel 20 is supported from the bottom of housing 10. The support means consist of a pedestal 26 affixed to the bottom of the housing. Pedestal 26 is provided with an opening through which passes an extension 28 of the shaft on which flywheel 20 rotates. A bearing 30, typically a tapered roller bearing, is located within pedestal 26 and secured to the bottom of housing 10. A thrust bearing 32 and a further tapered roller bearing 34 are mounted on a support washer 36 which is positioned on the top of pedestal 26. Undesirable movement of bearing 30 and bearings 32 an 34 is prevented in the customary manner; the bearing outer races being located within a housing or housings which are respectively secured to the bottom of housing 10 and pedestal 26.

The drive flywheel 18 is supported on ring gear 16 and is keyed to a shaft 38 which is rotatable in a bearing 40 attached to the cover plate 12 of housing 10. Drive flywheel 18, in the preferred embodiment, has a plurality of electric drive motors 42, 44 and 46 mounted on its upper surface. The drive motors, as best shown in the case of motor 46 in FIG. 2, are mounted in brackets, such as bracket 48, and are located adjacent the periphery of flywheel 18 so as to have the motor output shafts extending outwardly from the periphery of the flywheel. Drive gears 50 are keyed to the output shafts of motors 42, 44 and 46 and mesh with the teeth of the ring gear 16.

Drive motors 42, 44 and 46 may be either AC or DC motors. If AC motors are employed, a solid state static inverter will be utilized to convert the direct current power derived from the batteries to alternating current. Both AC and DC drive systems have attributes and disadvantages. In the interest of system simplicity and minimizing the number of components employed, a DC drive is generally preferred. Electrical power is delivered to the motors in the conventional manner and, in the interest of facilitating understanding of the invention, the currnt transmitting means has been omitted from the drawing. Considering a DC drive, a commutator assembly may be incorporated on shaft 38 with the stator of the commutator assembly being supported from cover plate 12.

The power take-off for the drive system of the present invention includes an output or drive shaft 52. Shaft 52 is supported on bearings, not shown, in the sidewall of housing 10 at diametrically opposed points. Drive shaft 52 is positioned between flywheels 18 and 20 and is coupled to both flywheels by a drive or power-take-off wheel 54. The coupling of drive wheel 54 to shaft 52 is via a spline type connection, as may be seen from FIG. 2, whereby drive wheel 54 may be repositioned along shaft 52 by means not shown but well known in the art. The position of drive wheel 54 along shaft 52 relative to the axis of rotation of the flywheels determines the speed and direction of rotation of output shaft 52. Flywheels 18 and 20 are provided, coaxial with their axis of rotation, with recessed areas on their facing surfaces; such a recessed surface area being indicated at 56 in FIG. 1 and clearly visible in FIG. 2. With drive wheel 54 positioned within the axial recessed area, the drive will be in neutral and drive shaft 52 will not rotate. Drive shaft 52 may be coupled to an output mechanism such as, for example, the drive wheels of a motor vehicle.

In operation, current will be delivered to drive motors 42, 44 and 46 causing the output shafts thereof to rotate. Because of the direct drive between the motors and ring rear 16, energization of the drive motors will cause the drive flywheel 18 to rotate. Rotation of the drive flywheel 18 will be coupled, via rollers 22, to the driven flywheel 20 which will thereupon rotate about the same axis as but in the opposite direction to flywheel 18. The rotation of flywheels 18 and 20 will, when the drive wheel 54 is moved out of the neutral position, be coupled to drive shaft 52 via the friction connection between both flywheels and the drive wheel 54. Movement of drive wheel 54 along shaft 52 will allow the control of both speed and direction of rotation of drive shaft 52. Once the flywheels 18 and 20 have reached a desired speed, this speed may be automatically maintained by sensing the speed of rotation of the flywheels with a tachometer and employing conventional control circuitry to adjust the delivery of current to the electric motors. Under normal circumstances only a comparatively small amount of input power will be required to maintain the desired rotational speed of the flywheels once this speed has been reached. This attribute, in part a result of the additional mass provided by the "pancake" drive consisting of two counterrotating flywheels, enhances the efficiency of the electrical drive system of the present invention. In the environment of a motor vehicle, when operating on very hilly terrain, it may be necessary to adjust both the speed of rotation of the flywheels and the positioning of drive wheel 54 to achieve the desired operating characteristics.

As will be obvious to those skilled in the art, since the present invention is essentially a continuous motion system, efficiency can be enhanced by adding weight to the periphery of the flywheels. The added peripheral mounted weight could consist of properly designed batteries located adjacent the periphery of the flywheels whereby the batteries would serve the dual purposes of energizing the drive motors and adding weight.

While a preferred embodiment has been shown and described, various modifications and substitutions may be made thereto without departing from the spirit and scope of the invention. Thus, by way of example, any number of electric drive motors can be employed. If a single motor is desired, a counterbalancing weight will be added to the drive flywheel 18. Thus, it will be understood that the present invention has been described by way of illustration and not limitation.

What is claimed is:

1. Rotary motion producing apparatus comprising:
a housing;
first flywheel means, said first flywheel means including a first flywheel supported in said housing for rotation about an axis;
second flywheel means, said second flywheel means including a second flywheel supported in said housing for rotation about said axis;
drive means for causing said first flywheel to rotate about said axis, said drive means including at least a first electric motor;
means drivingly coupling said first flywheel to said second flywheel whereby said first and second flywheels rotate about said axis in opposite directions;
power take-off means, said power take-off means including a rotatable output shaft oriented transversely to said axis; and
means coupling said first and second flywheel means to said power take-off means whereby the motion of said flywheels is transmitted to said power take-off means output shaft.

2. The apparatus of claim 1 wherein said means coupling said flywheel means to said power take-off means includes:
a roller adapted to contact said first and second flywheels, said roller being mounted on said power take-off means output shaft.

3. The apparatus of claim 2 wherein said roller is movable along and rotatable with said power take-off means output shaft.

4. The apparatus of claim 1 wherein said drive means comprises:
at least a first electric motor mounted on said first flywheel adjacent the periphery thereof, said motor having an output shaft; and
means coupling said motor output shaft to said housing whereby energization of said motor will produce relative motion between said flywheels and said housing.

5. The apparatus of claim 4 wherein said means coupling said flywheel means to said power take-off means includes:
a roller adapted to contact said first and second flywheels, said roller being mounted on said power take-off means output shaft.

6. The apparatus of claim 5 wherein said roller is movable along and rotatable with said power take-off means output shaft.

7. The apparatus of claim 2 wherein said drive means comprises:
a first electric motor mounted on said first flywheel adjacent the periphery thereof, said first motor having an output shaft;
at least a second electric motor mounted on said first flywheel adjacent the periphery thereof, said second motor having an output shaft; and
means coupling said motor output shafts to said housing whereby energization of said motors will produce relative motion between said flywheels and said housing.

8. The apparatus of claim 7 wherein said means coupling said motor output shafts to said housing includes:
a drive gear mounted on each of said motor output shafts; and
a ring gear on the interior of said housing, said ring gear being positioned to be engaged by said gears on said motor output shafts.

9. The apparatus of claim 8 wherein said roller is in contact with facing surfaces of said first and second flywheels and is connected to the power take-off means output shaft by means of a spline-type connection whereby said roller is movable along and rotatable with said power take-off means output shaft.

10. The apparatus of claim 9 wherein said flywheels are each provided with an axial recess on the facing surfaces thereof, said recesses being of sufficient width and depth to receive said roller without contact between said roller and said flywheels being established whereby said motion producing apparatus may be placed in a neutral position by moving said roller to a position centered on said axis of rotation of said flywheels.

11. The apparatus of claim 6 wherein said means drivingly coupling said first and second flywheels comprises:
a plurality of rollers positioned between said flywheels, said rollers being in contact with the facing surfaces of said flywheels adjacent the peripheries thereof, said rollers being supported from said housing and being free to rotate about axes oriented transversely to the axis of rotation of said flywheels.

12. The apparatus of claim 10 wherein said means drivingly coupling said first and second flywheels comprises:
a plurality of rollers positioned between said flywheels, said rollers being in contact with the facing surfaces of said flywheels adjacent the peripheries thereof, said rollers being supported from said housing and being free to rotate about axes oriented transversely to the axis of rotation of said flywheels.

* * * * *